United States Patent
Lewis et al.

(10) Patent No.: US 12,236,206 B1
(45) Date of Patent: Feb. 25, 2025

(54) PRETRAINING A LANGUAGE MACHINE-LEARNING MODEL

(71) Applicant: Meta Platforms, Inc., Menlo Park, CA (US)

(72) Inventors: Michael William Lewis, Seattle, WA (US); Marjan Ghazvini Nejad, Seattle, WA (US); Gargi Ghosh, Bellevue, WA (US); Armen Aghajanyan, Bellevue, WA (US); Sida Wang, Bellevue, WA (US); Luke Zettlemoyer, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 824 days.

(21) Appl. No.: 17/331,478

(22) Filed: May 26, 2021

(51) Int. Cl.
   *G06F 40/58* (2020.01)
   *G06F 18/22* (2023.01)
   *G06N 3/048* (2023.01)
   *G06N 3/08* (2023.01)

(52) U.S. Cl.
   CPC .............. *G06F 40/58* (2020.01); *G06F 18/22* (2023.01); *G06N 3/048* (2023.01); *G06N 3/08* (2013.01)

(58) Field of Classification Search
   CPC .... G06F 40/211; G06F 40/253; G06F 40/268; G06F 40/284; G06F 40/30; G06F 40/58; G06F 40/44; G06F 40/45; G06F 40/47
   See application file for complete search history.

(56) References Cited

U.S. PATENT DOCUMENTS

| | | | |
|---|---|---|---|
| 8,095,544 B2 * | 1/2012 | Boone | G06F 40/30 707/723 |
| 8,533,148 B1 * | 9/2013 | Feuersanger | G06F 16/3346 706/62 |
| 10,083,229 B2 * | 9/2018 | Eyres | G06F 16/35 |
| 10,324,936 B2 * | 6/2019 | Feuersänger | G06N 20/00 |
| 11,232,358 B1 * | 1/2022 | Ramezani | G06F 40/216 |
| 11,410,072 B2 * | 8/2022 | Burstein | G06N 5/022 |
| 11,436,419 B2 * | 9/2022 | Li | G06N 3/08 |
| 11,921,728 B2 * | 3/2024 | Ahmed | G06N 20/00 |
| 2013/0006954 A1 * | 1/2013 | Nikoulina | G06F 40/44 707/706 |

(Continued)

OTHER PUBLICATIONS

Shen et al., title={Zero-shot cross-lingual neural headline generation}, journal={IEEE/ACM Transactions on Audio, Speech, and language Processing}, volume={26}, number={12}, pages={2319-2327}, year={2018}, publisher=IEEE (Year: 2018).*

(Continued)

*Primary Examiner* — Lamont M Spooner
(74) *Attorney, Agent, or Firm* — BakerHostetler

(57) ABSTRACT

In one embodiment, a method includes accessing a first document, accessing a plurality of second documents, calculating a relevance score for each of the plurality of second documents indicating a degree of relevance of the second document to the first document using an encoder of a machine-learning model, selecting a subset of the second documents based on their corresponding relevance scores, generating a target document by using the machine-learning model to process the subset of second documents and their corresponding relevance scores, and updating parameters of the machine-learning model based on a comparison between the first document and the generated target document.

20 Claims, 8 Drawing Sheets

(56) References Cited

U.S. PATENT DOCUMENTS

| | | | | |
|---|---|---|---|---|
| 2013/0103390 | A1* | 4/2013 | Fujita | G06F 40/279 704/9 |
| 2013/0212090 | A1* | 8/2013 | Sperling | G06F 16/9535 707/723 |
| 2014/0350914 | A1* | 11/2014 | Andrade Silva | G06F 40/44 704/2 |
| 2016/0098456 | A1* | 4/2016 | Contreras | G06F 16/2477 707/739 |
| 2016/0155067 | A1* | 6/2016 | Dubnov | G06F 40/30 706/12 |
| 2017/0228434 | A1* | 8/2017 | Beller | G06F 40/279 |
| 2019/0163817 | A1* | 5/2019 | Milenova | G06F 16/35 |
| 2020/0210523 | A1* | 7/2020 | Aghajanyan | G06N 3/044 |
| 2021/0133498 | A1* | 5/2021 | Zhang | G06F 18/28 |
| 2021/0142210 | A1* | 5/2021 | Cheng | G06V 10/764 |
| 2022/0075945 | A1* | 3/2022 | Zhang | G06F 40/295 |
| 2022/0083744 | A1* | 3/2022 | Li | G06N 3/045 |
| 2022/0198144 | A1* | 6/2022 | Yang | G06N 20/00 |
| 2022/0245161 | A1* | 8/2022 | Ahmed | G06F 16/9035 |

OTHER PUBLICATIONS

Title={Zero-shot paraphrase generation with multilingual language models}, author={Guo, Yinpeng and Liao, Yi and Jiang, Xin and Zhang, Qing and Zhang, Yibo and Liu, Qun}, journal={arXiv preprint arXiv: 1911.03597}, year={2019}, pp. 1-9 (Year: 2019).*

Artetxe M., et al., "Massively Multilingual Sentence Embeddings for Zero-Shot Cross-Lingual Transfer and Beyond," Transactions of the Association for Computational Linguistics, 2019, vol. 7, pp. 597-610.

Artetxe M., et al., "Unsupervised Neural Machine Translation," arXiv preprint arXiv:1710.11041, 2017, 11 pages.

Clark K., et al., "ELECTRA: Pre-training Text Encoders as Discriminators Rather Than Generators," arXiv preprint arXiv:2003.10555, 2020, 18 pages.

Conneau A., et al., "Unsupervised Cross-lingual Representation Learning at Scale," arXiv preprint arXiv:1911.02116, 2019, 12 pages.

Devlin J., et al., "BERT: Pre-Training of Deep Bidirectional Transformers for Language Understanding," arXiv preprint arXiv:1810.04805, 2018, 14 pages.

Dong L., et al., "Unified Language Model Pre-training for Natural Language Understanding and Generation," Microsoft Research, arXiv preprint arXiv:1905.03197, 2019, 14 pages.

Fan A., et al., "Controllable Abstractive Summarization," arXiv preprint arXiv:1711.05217, 2017, 10 pages.

Guu K., et al., "Generating Sentences by Editing Prototypes," Transactions of the Association for Computational Linguistics, 2018, vol. 6, pp. 437-450.

Guu K., et al., "REALM: Retrieval-Augmented Language Model Pre-Training," arXiv preprint arXiv:2002.08909, 2020, 12 pages.

Hu J., et al., "Xtreme: A Massively Multilingual Multi-task Benchmark for Evaluating Cross-lingual Generalization," arXiv preprint arXiv:2003.11080, 2020, 20 pages.

Johnson J., et al., "Billion-Scale Similarity Search with GPUs," IEEE Transactions on Big Data, Jul.-Sep. 2021, vol. 7, No. 3, pp. 535-547.

Johnson M., et al., "Google's Multilingual Neural Machine Translation System: Enabling Zero-Shot Translation," Transactions of the Association for Computational Linguistics, 2017, vol. 5, pp. 339-351.

Joulin A., et al., "FastText.zip: Compressing Text Classification Models," arXiv preprint arXiv:1612.03651, 2016, 13 pages.

Kaplan J., et al., "Scaling Laws for Neural Language Models," arXiv preprint arXiv:2001.08361, 2020, 30 pages.

Khandelwal U., et al., "Generalization Through Memorization: Nearest Neighbor Language Models," arXiv preprint arXiv:1911.00172, 2019, 13 pages.

Lample G., et al., "Cross-lingual Language Model Pretraining," arXiv preprint arXiv:1901.07291, 2019, 10 pages.

Lample G., et al., "Unsupervised Machine Translation Using Monolingual Corpora Only," arXiv preprint arXiv:1711.00043, 2017, 12 pages.

Lewis M., et al., "BART: Denoising Sequence-to-Sequence Pretraining for Natural Language Generation, Translation, and Comprehension," arXiv preprint arXiv:1910.13461, 2019, 10 pages.

Lewis M., et al., "Pre-training via Paraphrasing," arXiv preprint arXiv:2006.15020v1 [cs.CL], Jun. 26, 2020, 14 pages.

Lewis P., et al., "MLQA: Evaluating Cross-lingual Extractive Question Answering," arXiv preprint arXiv:1910.07475, 2019, 14 pages.

Lewis P., et al., "Retrieval-Augmented Generation for Knowledge-Intensive NLP Tasks," arXiv preprint arXiv:2005.11401, 2020, 19 pages.

Li Z., et al., "Train Large, Then Compress: Rethinking Model Size for Efficient Training and Inference of Transformers," arXiv preprint arXiv:2002.11794, 2020, 14 pages.

Liu P.J., et al., "Generating Wikipedia by Summarizing Long Sequences," arXiv preprint arXiv:1801.10198, 2018, 18 pages.

Liu Y., et al., "Multilingual Denoising Pre-Training for Neural Machine Translation," arXiv preprint arXiv:2001.08210, 2020, 17 pages.

Liu Y., et al., "ROBERTa: A Robustly Optimized BERT Pretraining Approach," arXiv preprint arXiv:1907.11692, 2019, 13 pages.

McCann B., et al., "Learned in Translation: Contextualized Word Vectors," In Advances in Neural Information Processing Systems, 2017, pp. 6294-6305.

Miculicich L., et al., "Document-Level Neural Machine Translation with Hierarchical Attention Networks," arXiv preprint arXiv:1809.01576, 2018, 8 pages.

Post M., "A Call for Clarity in Reporting BLEU Scores," arXiv preprint arXiv:1804.08771, 2018, 6 pages.

Raffel C., et al., "Exploring the Limits of Transfer Learning with a Unified Text-to-Text Transformer," arXiv preprint arXiv:1910.10683, 2019, 53 pages.

Rajpurkar P., et al., "SQuAD: 100,000+ Questions for Machine Comprehension of Text," arXiv preprint arXiv:1606.05250, 2016, 10 pages.

Rogers A., et al., "A Primer in BERTology: What We Know About How BERT Works," arXiv preprint arXiv:2002.12327, 2020, 23 pages.

Schwenk H., et al., "CCMatrix: Mining Billions of High-Quality Parallel Sentences on the Web," arXiv preprint arXiv:1911.04944, 2019, 13 pages.

Scialom T., et al., "MLSUM: The Multilingual Summarization Corpus," arXiv preprint arXiv:2004.14900, 2020, 16 pages.

Siddhant A., et al., "Evaluating the Cross-Lingual Effectiveness of Massively Multilingual Neural Machine Translation," arXiv preprint arXiv:1909.00437, 2019, 13 pages.

Vaswani A., et al., "Attention is All You Need," Advances in Neural Information Processing Systems, 2017, pp. 5998-6008.

Wieting J., et al., "No Training Required: Exploring Random Encoders for Sentence Classification," arXiv preprint arXiv:1901.10444, 2019, 16 pages.

Yang Y., et al., "Paws-X: A Cross-lingual Adversarial Dataset for Paraphrase Identification," arXiv preprint arXiv:1908.11828, 2019, 6 pages.

Yang Z., et al., "XLNet: Generalized Autoregressive Pretraining for Language Understanding," arXiv preprint arXiv:1906.08237, 2019, 18 pages.

Zweigenbaum P., et al., "Overview of the Third BUCC Shared Task: Spotting Parallel Sentences in Comparable Corpora," In Proceedings of 11th Workshop on Building and Using Comparable Corpora, 2018, pp. 39-42.

* cited by examiner

|  | IWSLT2017 | | | | | WMT19 |
| --- | --- | --- | --- | --- | --- | --- |
|  | ar | de | fr | ja | zh | de |
| Into English | 26.8 | 28.5 | 34.3 | 12.6 | 19.9 | 35.8 |
| From English | 12.9 | 14.4 | 25.5 | 10.7 | 12.9 | 13.4 |

|  |  | Target | | | | |
| --- | --- | --- | --- | --- | --- | --- |
|  |  | de | en | it | nl | ro |
| Source | de | - | 30.6 | 14.0 | 14.8 | 11.6 |
|  | en | 18.8 | - | 14.3 | 15.0 | 14.0 |
|  | it | 14.0 | 31.7 | - | 11.3 | 12.7 |
|  | nl | 14.3 | 27.5 | 12.6 | - | 9.3 |
|  | ro | 14.3 | 32.8 | 14.4 | 9.8 | - |

Zero-shot unsupervised document level machine translation BLEU scores using the pre-trained model, with no fine-tuning or special constraints on generation. Performance varies considerably across languages, but is non-trivial with even distantly related languages.

*FIG. 3A*

|  | en-de | zh-en |
| --- | --- | --- |
| Random Initialization | 7.7 | 3.2 |
| HAN [Miculicich et al., 2018] | - | 24.0 |
| mBART (sentence) | 38.0 | 28.4 |
| mBART (document) | 38.5 | 29.6 |
| MARGE | 39.2 | 28.4 |

Supervised document-level machine translation. Comparison results are from Liu et al. [2020]. MARGE performs similarly to mBART.

*FIG. 3B*

|  | en | ar | de | es | hi | vi | zh | avg | en | de | es | fr | ja | ko | zh | avg |
| --- | --- | --- | --- | --- | --- | --- | --- | --- | --- | --- | --- | --- | --- | --- | --- | --- |
| mBERT | 80.2 | 52.3 | 59.0 | 67.4 | 50.2 | 61.2 | 59.6 | 61.4 | 94.0 | 85.7 | 87.4 | 87.0 | 73.0 | 69.6 | 77.0 | 81.9 |
| MMTE | 78.5 | 56.1 | 58.4 | 64.9 | 46.2 | 59.4 | 58.3 | 60.3 | 93.1 | 85.1 | 87.2 | 86.9 | 72.0 | 69.2 | 75.9 | 81.3 |
| XLM | 68.6 | 42.5 | 50.8 | 54.7 | 34.4 | 48.3 | 40.5 | 48.5 | 94.0 | 85.9 | 88.3 | 87.4 | 69.3 | 64.8 | 76.5 | 80.9 |
| XLM-R | 83.5 | 66.6 | 70.1 | 74.1 | 70.6 | 74.0 | 62.1 | 71.6 | 94.7 | 89.7 | 90.1 | 90.4 | 78.7 | 79.0 | 82.3 | 86.4 |
| MARGE | 83.7 | 64.5 | 68.7 | 73.4 | 67.2 | 71.5 | 67.8 | 71.0 | 94.7 | 89.4 | 91.6 | 90.9 | 78.9 | 77.7 | 82.5 | 86.5 |

(a) F1 scores on the MLQA question answering task.   (b) Paraphrasing accuracy on PAWS-X.

*FIG. 3C*

| Model | Setting | MLSum de | es | fr | ru | tr | avg |
|---|---|---|---|---|---|---|---|
| Extractive Oracle | Oracle | 52.30 | 35.78 | 37.69 | 29.80 | 45.78 | 29.81 |
| Lead 3 | Deterministic | 33.09 | 13.70 | 19.69 | 5.94 | 28.90 | 13.65 |
| Pointer-Generator | Train One | 35.08 | 17.67 | 23.58 | 5.71 | 32.59 | 15.91 |
| M-BERT | Train One | 42.01 | 20.44 | 25.09 | 9.48 | 32.94 | 17.59 |
| MARGE-NEWS | Zero-shot Transfer | 30.01 | 17.81 | 19.39 | 8.67 | 29.39 | 15.05 |
| MARGE-NEWS | Train One | 42.60 | 22.31 | 25.91 | 10.85 | 36.09 | 19.03 |
| MARGE | Train All | 42.70 | 22.27 | 25.78 | 10.85 | 35.47 | 18.87 |
| MARGE-NEWS | Train All | 42.77 | 22.72 | 25.79 | 11.03 | 35.90 | 19.09 |

ROUGE-L scores on MLSum. MARGE generates abstractive summaries that outperform an extractive mBERT model. We also demonstrate zero-shot transfer learning, where the model is trained only on languages it is not trained on, and results from training on all languages.

FIG. 4A

| | de | fr | ru | zh | avg |
|---|---|---|---|---|---|
| mBERT | 62.5 | 62.6 | 51.8 | 50.0 | 56.7 |
| MMTE | 67.9 | 63.9 | 54.3 | 53.3 | 59.8 |
| XLM | 56.3 | 63.9 | 60.6 | 46.6 | 56.8 |
| XLM-R | 67.5 | 66.5 | 73.5 | 56.7 | 66.0 |
| MARGE | 78.8 | 75.9 | 77.3 | 71.6 | 75.9 |

Unsupervised Sentence Retrieval results on BUCC. MARGE outperforms other unsupervised models.

FIG. 4B

PRETRAINING A LANGUAGE MACHINE-LEARNING MODEL

TECHNICAL FIELD

This disclosure generally relates to machine-learning solutions, and in particular relates to pretraining a language machine-learning model.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for pretraining a language machine-learning model in an unsupervised manner. The pretrained language machine-learning model may be capable of generating multi-lingual paraphrases for multiple input documents. Previous approaches for pretraining a language machine-learning model are mainly based on masked language modeling, in which the machine-learning model is trained while the machine-learning model fills one or more blanks in the documents. The method disclosed in this invention trains a machine-learning model while the machine-learning model reconstructs a target document by retrieving a set of related documents (potentially in many languages) and conditioning on them to maximize the likelihood of generating an original document. The proposed training method may be viewed as a new type of denoising auto-encoder where the noise comes from the retrieval step and is much more diverse than masking. The retrieved documents may have little lexical overlap with the target, and may not even be in the same language, but still should communicate the same underlying information. The proposed method allows the machine-learning model to be trained for both retrieval and reconstruction simultaneously. The pre-trained machine-learning model may be utilized in various tasks including a paraphrasing of a document, a translation of a document, a multi-document summarization, an information retrieval, a document classification, or any other suitable task.

In particular embodiments, a computing device may access a first document. The computing device may access a plurality of second documents. Making sure that at least a part of the plurality of second documents are relevant to the first document is important for training the machine-learning model. In particular embodiments, the plurality of second documents may comprise documents published on a date that the first document is published on. In particular embodiments, the plurality of second documents may comprise documents written in different languages. The documents may still communicate similar underlying information. In particular embodiments, the plurality of second documents may comprise documents whose corresponding relevance scores calculated using the encoder of the machine-learning model with previous parameter values exceed a pre-determined threshold. The computing device may calculate a relevance score for each of the plurality of second documents using an encoder of the machine-learning model. The relevance score may indicate a degree of relevance of the second document to the first document. In particular embodiments, the machine-learning model may be a sequence-to-sequence machine-learning model. The sequence-to-sequence machine-learning model may comprise an encoder and a decoder. To calculate a relevance score for a second document, the computing device may generate a first embedding vector representing the first document using the encoder of the machine-learning model. The computing device may generate a second embedding vector representing the second document using the encoder of the machine-learning model. And, the computing device may calculate a relevance metric between the first embedding vector and the second embedding vector. In particular embodiments, the relevance metric may be a cosine similarity. The computing device may select a subset of the second documents based on their corresponding relevance scores. To select the subset of the second documents, the computing device may select k second documents whose corresponding relevance scores are higher than corresponding relevance scores for the other second documents among the plurality of second documents. The computing device may generate a target document by using the machine-learning model to process the subset of second documents and their corresponding relevance scores. To generate the target document by using the machine-learning model to process the subset of second documents and their corresponding relevance scores, the computing device may generate embedding vectors for each of the subset of second documents using the encoder of the machine-learning model. The computing device may concatenate the generated embedding vectors. A corresponding relevance score for each of the generated embedding vectors may be used to bias cross-attention from a decoder of the machine-learning model to the encoder of the machine-learning model. The computing device may generate the target document by using the decoder of the machine-learning model to process the concatenated embeddings. The computing device may update parameters of the machine-learning model based on a comparison between the first document and the generated target document. The computing device may perform a backward propagation procedure to update parameters of the machine-learning model.

In particular embodiments, the machine-learning model may be used for a task after being trained. In particular embodiments, the task may be a paraphrasing of a document, or a translation of a document. In particular embodiments, the task may be a multi-document summarization. For this task, the computing device may access a plurality of documents and their pre-determined corresponding relevance scores. The computing device may process the accessed plurality of documents and their pre-determined corresponding relevance scores by the machine-learning model to generate a document summarizing the plurality of documents. In particular embodiments, the pre-determined corresponding relevance scores may be identical to each other. In particular embodiments, the task may be an information retrieval. The computing device may select k documents among a large number of documents that are more relevant to a given document. The computing device may calculate a relevance score for each of the large number of documents using the encoder of the machine-learning model. The computing device select k documents among a large number of documents based on their corresponding relevance scores. In particular embodiments, the task may be a document classification. The encoder of the machine-learning model may be connected to a classifier for this task. The classifier may be trained to determine a class of an input document based on embedding vectors that the encoder generates based on the input document. In particular embodiments, the decoder of the machine-learning model may be re-trained to generate a word string indicating a class of an input document.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3A illustrates performance evaluation results for unsupervised translation.

FIG. 3B illustrates performance evaluation results for supervised translation.

FIG. 3C illustrates performance evaluation results for a question answering task and a paraphrasing task.

FIG. 4A illustrates monolingual sequence-to-sequence generation performance evaluation results on text summarization tasks.

FIG. 4B illustrates performance evaluation results on a cross-lingual sentence retrieval.

DESCRIPTION OF EXAMPLE EMBODIMENTS

Figure 1:
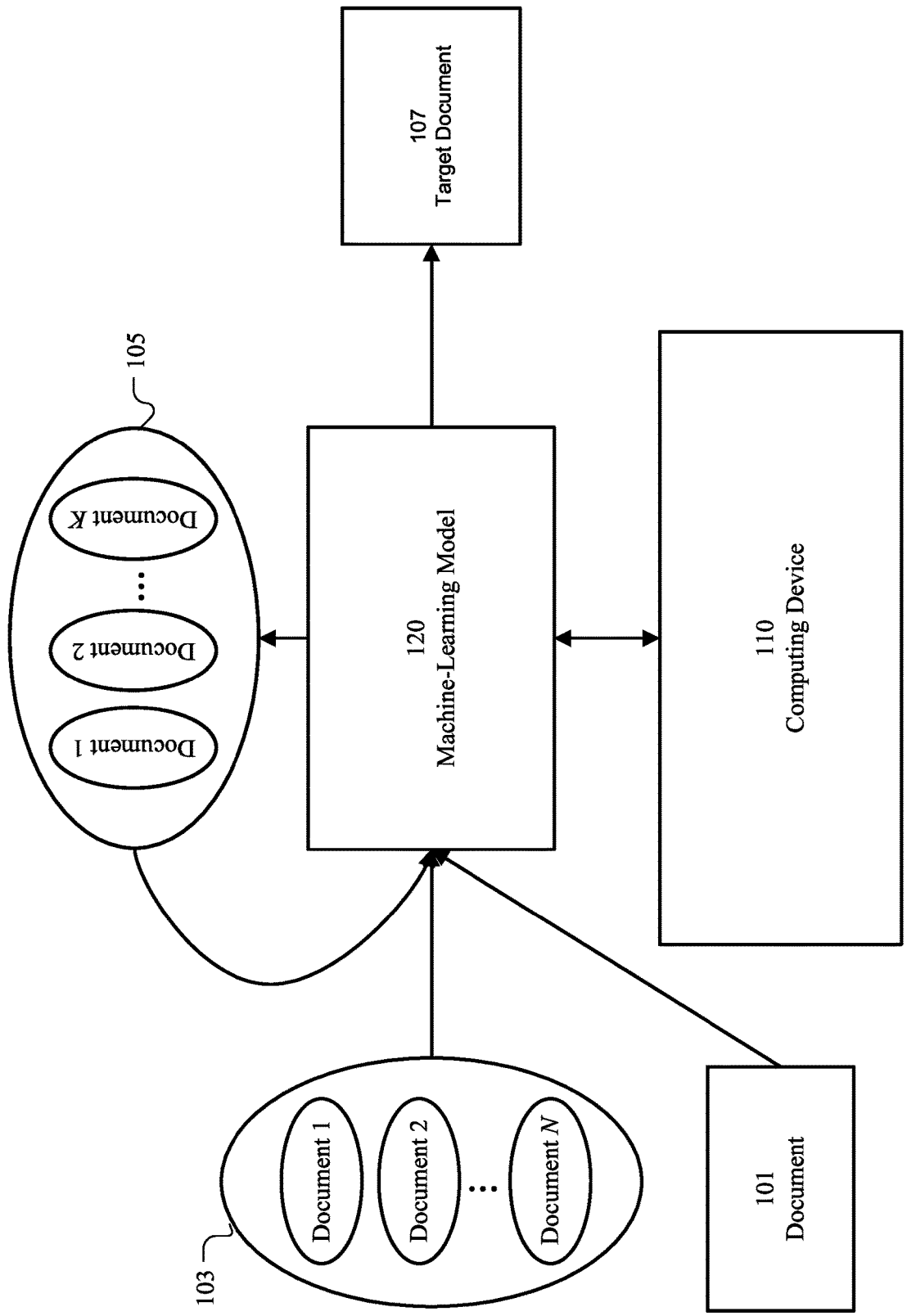
FIG. 1 illustrates an example logical system architecture for pretraining a language machine-learning model.

FIG. 1 illustrates an example logical system architecture for pretraining a language machine-learning model. A computing device 110 may access a first document 101. The computing device 110 may reconstruct a target document 107 by using a machine-learning model 120 to process selected K documents 105 and their corresponding relevance scores. The computing device 110 may compute gradients for parameters of the machine-learning model 120 based on a comparison between the first document 101 and the reconstructed target document 107. To select the K documents 105 among N documents 103 in a document pool, the computing device 110 may compute a relevance score for each of the N documents 103 indicating a degree of relevance of the document to the first document 101 by processing the document with an encoder of the machine-learning model 120. The computing device 110 may select the K documents 105 whose relevance scores are highest among the N documents 103. The N documents 103 may introduce considerable noise as degrees of relevance of each of the N documents 103 to the first document 101 would be significantly diverse. The selected K documents may have little lexical overlap with the first document 101, and may not even be in the same language, but still should communicate the same underlying information. Although this disclosure describes a particular system architecture for pretraining a language machine-learning model, this disclosure contemplates any suitable system architecture for pretraining a language machine-learning model.

Figure 2:
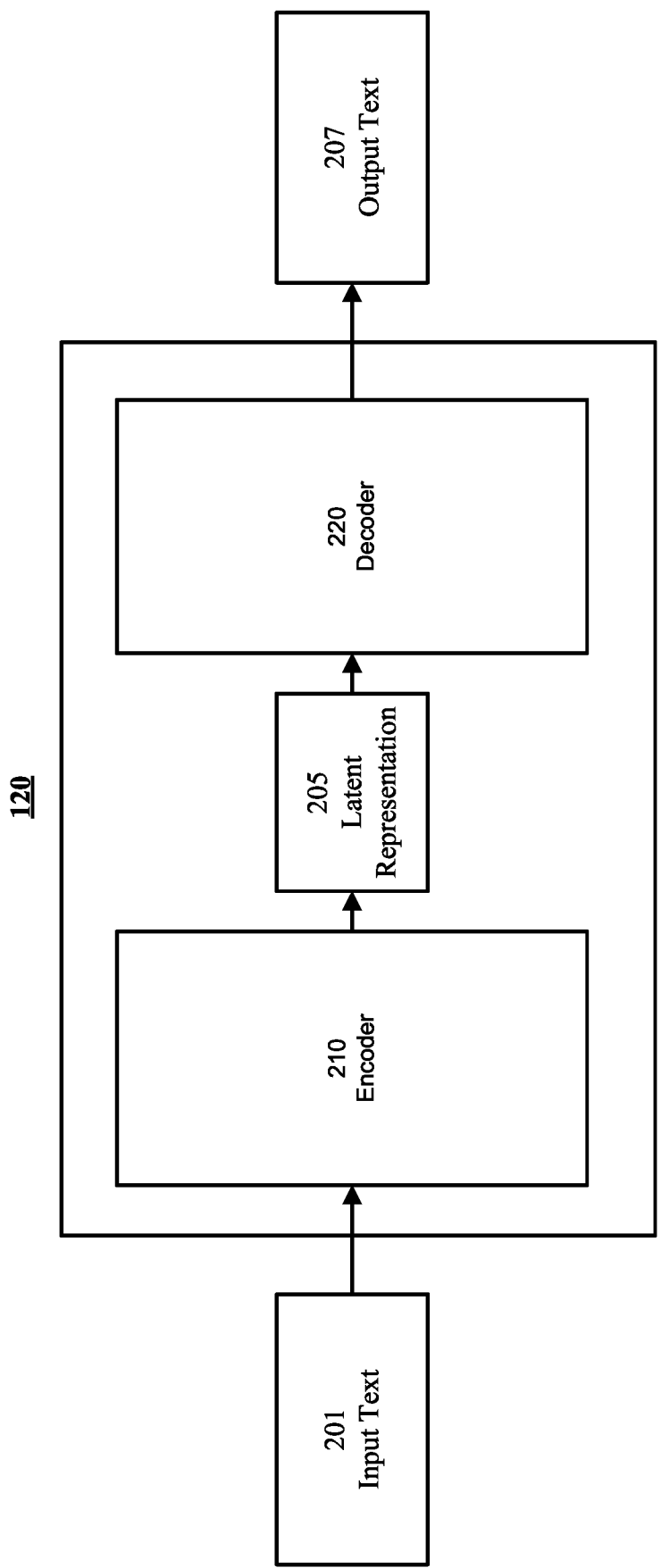
FIG. 2 illustrates an example logical architecture for the machine-learning model.

FIG. 2 illustrates an example logical architecture for the machine-learning model. In particular embodiments, the machine-learning model 120 may be a sequence-to-sequence machine-learning model as illustrated in FIG. 2. The sequence-to-sequence machine-learning model 120 may comprise an encoder 210 and a decoder 220. The encoder 210 of the sequence-to-sequence machine-learning model 120 may process an input text 201 to generate a latent representation 205 of the input text 201. The latent representation 205 may comprise one or more embedding vectors. The decoder 220 of the sequence-to-sequence machine-learning model 120 may process the latent representation 205 generated by the encoder 210 to produce an output text 207. As an example and not by way of limitation, the encoder 210 may comprise 12 Transformer layers of dimension 1024, with feedforward layers of size 4096. The decoder 220 may comprise 12 Transformer layers of dimension 1024, with the feed-forward layers of size 16536. Four additional Transformer layers may be added to the base of the decoder with only self-attention and feedforward layers of size 4096, which may allow words in the target document 107 to contextualize locally before the more expensive cross-attention and feed-forward layers. In total, the machine-learning model 120 may contain roughly 960M parameters. For calculating relevance scores, the first 4 layers of the encoder 210 may be used. Although this disclosure describes a particular architecture for the language machine-learning model, this disclosure contemplates any suitable architecture for the language machine-learning model.

In particular embodiments, the computing device 110 may train the machine-learning model with a corpus of documents. At each iteration of the training process, the computing device 110 may access a first document 101. The first document may be used as a ground truth document. The computing device 110 may generate a target document 107 by using the machine-learning model 120 to process a subset of documents 105 and their corresponding relevance scores to the first document 101. The subset of documents 105 are selected among a plurality of documents 103 based on their corresponding relevance scores. A relevance score of a document may represent a degree of relevance of the document to the first document 101. A relevance score for each of the plurality of documents 103 may be computed using the encoder 210 of the machine-learning model 120. The computing device 110 may compute a loss based on a comparison between the first document 101 and the generated target document 107. The computing device 110 may update parameters of the machine-learning model 120 based on the computed loss. Although this disclosure describes training a language machine-learning model using a plurality of documents and their corresponding relevance scores in a particular manner, this disclosure contemplates training a language machine-learning model using a plurality of documents and their corresponding relevance scores in any suitable manner.

In particular embodiments, the computing device 110 may access a plurality of second documents 103. Making sure that at least a part of the plurality of second documents 103 are relevant to the first document 101 is important for training the machine-learning model. A subset 105 of the plurality of second documents that are relevant to the first document 101 may provide useful information for reconstructing the target document 107. In particular embodiments, the first document 101 may be a news article. The plurality of second documents 103 may comprise news articles published on a date that the first document 101 is published on. As an example and not by way of limitation, a plurality of news articles published on a day following a presidential election may address a result of the election and analysis on the result. The first document 101 may be randomly selected from the plurality of new articles. The plurality of second documents 103 may comprise news articles that are published on the same date. At least a subset of the plurality of second documents 103 may communicate same content with the first document 101 using different words. Although this disclosure describes preparing a plurality of second documents based on a publication date of the second documents in a particular manner, this disclosure contemplates preparing a plurality of second documents based on a publication date of the second documents in any suitable manner.

In particular embodiments, the plurality of second documents 103 may comprise documents written in different languages. At least a part of the plurality of second documents 103 may communicate the same underlying information that the first documents 101 communicates. As an example and not by way of limitation, a web service domain may provide same information in a plurality of languages. A page from the web service domain in a first language may be selected as the first document 101. The identical content from the web service domain in different languages may be included into the plurality of second documents 103. Although this disclosure describes preparing a plurality of second documents in different languages in a particular manner, this disclosure contemplates preparing a plurality of second documents in different languages in any suitable manner.

In particular embodiments, the plurality of second documents may comprise documents whose corresponding relevance scores calculated using the encoder 210 of the machine-learning model 120 with parameter values updated in previous trainings exceed a pre-determined threshold. At a beginning of a training, the computing device 110 may prepare a plurality of first documents 101 $\{x_1, x_2, \ldots, x_N\}$, and a plurality of second documents 103 $\{z_1, z_2, \ldots, z_M\}$. The computing device 110 may compute a relevance score for each pair of a first document and a second document ($x_i$, $z_j$). For each first document 101 $x_i$, the computing device may construct a set of second documents whose relevance scores to the first document $x_i$ exceed a pre-determined threshold. The computing device 110 may re-group the second documents 103 after training the machine-learning model 120 for a pre-determined number of iterations by re-computing relevance scores using the encoder 210 of the so-far trained machine-learning model 120. Although this disclosure describes preparing a plurality of second documents based on computed relevance scores in a particular manner, this disclosure contemplates preparing a plurality of second documents based on computed relevance scores in any suitable manner.

In particular embodiments, the computing device 110 may calculate a relevance score for each of the plurality of second documents 103 using an encoder 210 of a machine-learning model 120. The relevance score may indicate a degree of relevance of the second document to the first document 101. To calculate a relevance score for a second document, the computing device 110 may generate a first embedding vector representing the first document 101 using the encoder 210 of the machine-learning model 120. The computing device 110 may generate a second embedding vector representing the second document 103 using the encoder 210 of the machine-learning model 120. Then, the computing device 110 may calculate a relevance metric between the first embedding vector and the second embedding vector. In particular embodiments, the relevance metric may be a cosine similarity. In particular embodiments, the relevance metric may be a Minkowski distance, a Mahalanobis distance, a Jaccard similarity coefficient, or any suitable similarity metric. As an example and not by way of limitation, the computing device 110 may generate a first embedding vector representing the first document 101 by taking the representation of the first token from the top of a 4-layer Transformer. The computing device 110 may generate a second embedding vector representing a second document 103 by taking the representation of the first token from the top of the 4-layer Transformer. The computing device 110 may calculate a cosine similarity between the first embedding vector and the second embedding vector as a relevance score. The 4-layer Transformer is a part of the encoder 210 of the machine-learning model 120. Although this disclosure describes calculating a relevance score between a first document and a second document in a particular manner, this disclosure contemplates calculating a relevance score between a first document and a second document in any suitable manner.

In particular embodiments, the computing device 110 may select a subset 105 of the second documents based on their corresponding relevance scores. To select a subset 105 of the second documents, the computing device 110 may select k second documents whose corresponding relevance scores are higher than relevance scores for the other second documents among the plurality of second documents 103. Although this disclosure describes selecting a subset of the second documents based on their corresponding relevance scores in a particular manner, this disclosure contemplates selecting a subset of the second documents based on their corresponding relevance scores in any suitable manner.

In particular embodiments, the computing device 110 may generate a target document 107 by using the machine-learning model 120 to process the subset 105 of second documents and their corresponding relevance scores. To generate the target document 107 by using the machine-learning model 120 to process the subset 105 of second documents and their corresponding relevance scores, the computing device 110 may generate a latent representation 205 for each of the subset 105 of second documents using the encoder 210 of the machine-learning model 120. The computing device 110 may concatenate the generated latent representations 205. A corresponding relevance score for each of the generated latent representations 205 may be used to bias cross-attention from a decoder 220 of the machine-learning model 120 to the encoder 210 of the machine-learning model 120 so that the decoder 220 will pay more attention to more relevant second documents among the subset 105 of the second documents. The computing device 110 may generate the target document by using the decoder 220 of the machine-learning model 120 to process the concatenated latent representations 205. Using more relevant subset 105 of second documents may improve the likelihood of reconstructing the first document 101, so gradient descent on a computed loss may improve the quality of the relevance scores. A standard Transformer sequence-to-sequence model may compute a matrix of cross-attention probabilities between all elements of a first document 101 $x_i$ and a second document $z_j$:

$$\alpha = \text{softmax}_{z_j}(Q^{lh}(x_i)K^{lh}(z_j)) \in \mathbb{R}^{|x_i| \times |z_j|}$$

where $Q^{lh}$ and $K^{lh}$ compute query and key representations for layer l and head h, and $\text{softmax}_{z_j}$ denotes a softmax normalized over elements of $z_j$. Instead, the computing device 110 may compute cross attention over the subset 105 of second documents biasing the attention scores with their corresponding relevance scores as:

$$\alpha = \text{softmax}_{z_{i\ldots M}} = Q^{lh}(x_i)K^{lh}(z_{1\ldots M}) + \beta f(x_i, z_j) \in \mathbb{R}^{|x_i| \times \Sigma_j |z_j|}$$

where $\beta$ is a trainable scalar parameter that weights the importance of the relevance score between the documents. Although this disclosure describes generating a target document based on a subset of second documents and their corresponding relevance scores in a particular manner, this disclosure contemplates generating a target document based on a subset of second documents and their corresponding relevance scores in any suitable manner.

In particular embodiments, the computing device 110 may update parameters of the machine-learning model 120 based on a comparison between the first document 101 and the generated target document 107. Given a subset 105 of second documents $z_{1\ldots M}$ and relevance scores $f(x_i, z_j)$, the computing device 110 may compute an auto-encoder loss for a first document 101 $x_i$, where a reconstruction of the first document 101 $x_i$ is indirectly conditioned on $x_i$, but with an intermediate bottleneck provided by the subset 105 of second documents and their corresponding relevance scores.

$$L_\theta = -\sum_i \log p_\theta(x_i \mid z_{1\ldots M}, f(x_1, z_1), \ldots, f(x_i, z_M))$$

The computing device 110 may perform a backward propagation procedure to update parameters of the machine-learning model 120. Although this disclosure describes updating parameters of the machine-learning model in a particular manner, this disclosure contemplates updating parameters of the machine-learning model in any suitable manner.

In particular embodiments, the machine-learning model may be used for a task after being pretrained. In particular embodiments, the task may be a translation of a document. During pretraining, the machine-learning model 120 can select a subset 105 of second documents in different languages that are relevant to the first document 101. Translation may offer a direct measure of how well the encoder 210 and decoder 220 of the pretrained machine-learning model 120 work for different languages. Experiments have been performed to measure the translation performance of the proposed machine-learning model 120 with previous approaches. Unlike previous works on unsupervised translation, the machine-learning model 120 is not further fine-tuned with iterative back-translation, or bitext in other language pairs. Both translation into English, which compares encoder performance for other languages, and translation out of English, which measures the decoder performance, have been evaluated. Generation hyperparameters were minimally tuned on German/English development and are shared across all translation pairs. FIG. 3A illustrates performance evaluation results for unsupervised translation. Performance varies considerably by language, but reaches 35.8 for German to English, which is the highest score known for a system that is trained with no bitext. Performance is also strong for some languages using different scripts, such as Arabic to English. However, some languages, e.g., Japanese, work less well. Generating non-English languages proves harder in all cases, particularly those with non-Latin alphabets, but English to French works well. Qualitatively, the translations are often good but less literal translations than the reference. This may cause BLEU scores to underestimate performance. The machine-learning model 120 may be fine-tuned for translation using labeled bitext. FIG. 3B illustrates performance evaluation results for supervised translation. The performance of the machine-learning model 120 is compared with mBART. The machine-learning model 120, labelled as MARGE, and mBART perform similarly, with the machine-learning model 120 performing better on English-German and mBART on Chinese-English. Both outperform baselines by a wide margin. Although this disclosure describes utilizing the pretrained machine-learning model for a translation in a particular manner, this disclosure contemplates utilizing the pretrained machine-learning model for a translation in any suitable manner.

In particular embodiments, the task may be a machine-learning generated question answering on a given document. FIG. 3C illustrates performance evaluation results for a question answering task and a paraphrasing task. Question answering may offer another document level reasoning task that is easily posed in many languages. For evaluation, the MLQA dataset, in which models are trained on the English SQUAD dataset and then tested in other languages, is used. FIG. 3C (a) shows that the machine-learning model 120, labelled as MARGE, achieves competitive performance with XLM-R, setting the state of the art for Chinese, and outperforms other models by a wide margin. Although this disclosure describes utilizing the pretrained machine-learning model for a question answering on a given document in a particular manner, this disclosure contemplates utilizing the pretrained machine-learning model for a question answering on a given document in any suitable manner.

In particular embodiments, the task may be a paraphrasing of a document. For evaluating the performance of the machine-learning model 120 in paraphrasing of a document, the PAWS-X paraphrase detection dataset is used. Models are required to determine whether two sentences are paraphrases. Adversarial examples that have high lexical overlap were constructed for the evaluation. Models are trained on English and tested on other languages. FIG. 3C (b) shows that the machine-learning model 120, labelled as MARGE, edges out a new state of the art, XLM-R. Although this disclosure describes utilizing the pretrained machine-learning model for a paraphrasing of a document in a particular manner, this disclosure contemplates utilizing the pretrained machine-learning model for a paraphrasing of a document in any suitable manner.

In particular embodiments, the task may be a multi-document summarization. For this task, the computing device 110 may access a plurality of documents and their pre-determined corresponding relevance scores. The computing device 110 may process the accessed plurality of documents and their pre-determined corresponding relevance scores by the machine-learning model to generate a document summarizing the plurality of documents. In particular embodiments, the pre-determined corresponding relevance scores may be identical to each other. FIG. 4A illustrates monolingual sequence-to-sequence generation performance evaluation results on text summarization tasks. The MLSum dataset is used to compare performance in several languages. FIG. 4A shows that the machine-learning model 120, labelled as MARGE, outperforms an extractive mBERT model and a seq2seq model without pre-training. In some cases, training one model on all languages (train all) improves results. A zero-shot summarization, where the model is trained on all languages except the test language, is also tested. The machine-learning model 120 outperforms a strong lead-3 baseline, and even a supervised pointer-generator model on Spanish and Russian. On this domain, MARGE-NEWS, a version of the model trained only on news, demonstrates better results. Although this disclosure describes utilizing a pretrained machine-learning model for a multi-document summarization in a particular manner, this disclosure contemplates utilizing a pretrained machine-learning model for a multi-document summarization in any suitable manner.

In particular embodiments, the task may be an information retrieval. The computing device 110 may select k documents among a large number of documents that are more relevant to a given document. The computing device 110 may calculate a relevance score for each of the large number of documents using the encoder of the machine-learning model. The computing device 110 select k documents among a large number of documents based on their corresponding relevance scores. The pretraining of the machine-learning model 120 may require the machine-learning model 120 to retrieve similar texts, which may be in different languages. As an extrinsic evaluation of this functionality, a cross-lingual sentence retrieval, in which a model must identify the correct translation of a sentence from a set of distractors, is tested. FIG. 4B illustrates performance evaluation results on a cross-lingual sentence retrieval. The performance is evaluated on BUCC2018 and Tatoeba. As a document representation, the average embedding of the fifth encoder layer is used. FIG. 4B shows that the machine-learning model 120, labelled as MARGE, outperforms other unsupervised models by almost 10 points On BUCC. On Tatoeba, there is significant variation across languages, but the machine-learning model 120, labelled as MARGE, performs comparably to XLM-R and significantly better than other pre-trained models. Better results have been achieved on both tasks using labeled bitext for training. Although this disclosure describes utilizing a pretrained machined-learning model for an information retrieval in a particular manner, this disclosure contemplates utilizing a pretrained machined-learning model for an information retrieval in any suitable manner.

In particular embodiments, the task may be a document classification. The encoder 210 of the machine-learning model 120 may be connected to a classifier for this task. The classifier may be trained to determine a class of an input document based on a latent representation 205 that the encoder 210 generates based on the input document. In particular embodiments, the decoder 220 of the machine-learning model 120 may be re-trained to generate a word string indicating a class of an input document. Although this disclosure describes utilizing a pretrained machine-learning model for a document classification in a particular manner, this disclosure contemplates utilizing a pretrained machine-learning model for a document classification in any suitable manner.

Figure 5:
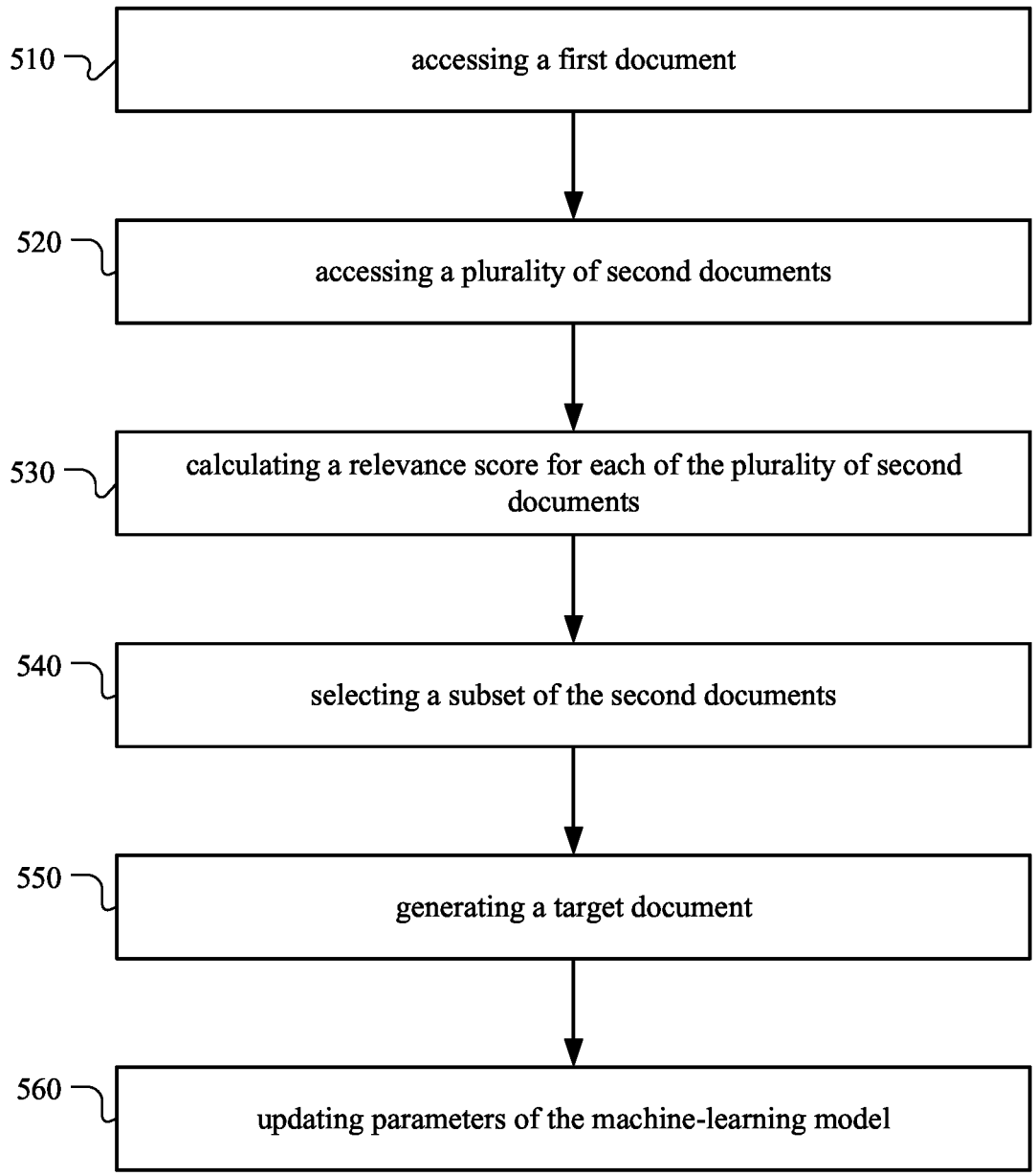
FIG. 5 illustrates an example method for pretraining a language machine-learning model in an unsupervised manner.

FIG. 5 illustrates an example method 500 for pretraining a language machine-learning model in an unsupervised manner. The method may begin at step 510, where the computing device 110 may access a first document. At step 520, the computing device 110 may access a plurality of second documents. At step 530, the computing device 110 may calculate a relevance score for each of the plurality of second documents indicating a degree of relevance of the second document to the first document using an encoder of a machine-learning model. At step 540, the computing device 110 may select a subset of the second documents based on their corresponding relevance scores. At step 550, the computing device 110 may generate a target document by using the machine-learning model to process the subset of second documents and their corresponding relevance scores. At step 560, the computing device 110 may update parameters of the machine-learning model based on a comparison between the first document and the generated target document. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for pretraining a language machine-learning model in an unsupervised manner including the particular steps of the method of FIG. 5, this disclosure contemplates any suitable method for pretraining a language machine-learning model in an unsupervised manner including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Vector Spaces and Embeddings

Figure 6:
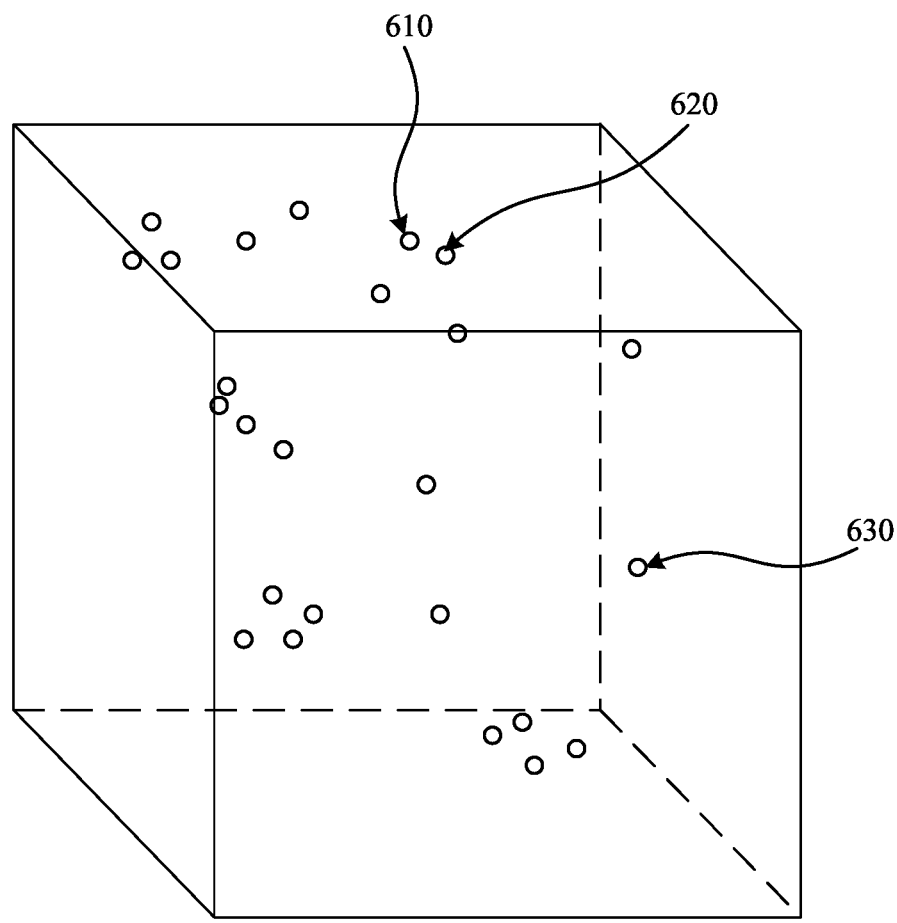
FIG. 6 illustrates an example view of an embedding space.

FIG. 6 illustrates an example view of a vector space 600. In particular embodiments, an object or an n-gram may be represented in a d-dimensional vector space, where d denotes any suitable number of dimensions. Although the vector space 600 is illustrated as a three-dimensional space, this is for illustrative purposes only, as the vector space 600 may be of any suitable dimension. In particular embodiments, an n-gram may be represented in the vector space 600 as a vector referred to as a term embedding. Each vector may comprise coordinates corresponding to a particular point in the vector space 600 (i.e., the terminal point of the vector). As an example and not by way of limitation, vectors 610, 620, and 630 may be represented as points in the vector space 600, as illustrated in FIG. 6. An n-gram may be mapped to a respective vector representation. As an example and not by way of limitation, n-grams $t_1$ and $t_2$ may be mapped to vectors $\vec{v_1}$ and $\vec{v_2}$ in the vector space 600, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 600. In particular embodiments, an n-gram may be mapped to a vector representation in the vector space 600 by using a machine leaning model (e.g., a neural network). The machine learning model may have been trained using a sequence of training data (e.g., a corpus of objects each comprising n-grams).

In particular embodiments, an object may be represented in the vector space 600 as a vector referred to as a feature vector or an object embedding. As an example and not by way of limitation, objects $e_1$ and $e_2$ may be mapped to vectors $\vec{v_1}$ and $\vec{v_2}$ in the vector space 600, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 600. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 600. As an example and not by way of limitation, vector 610 and vector 620 may correspond to objects that are more similar to one another than the objects corresponding to vector 610 and vector 630, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 7:
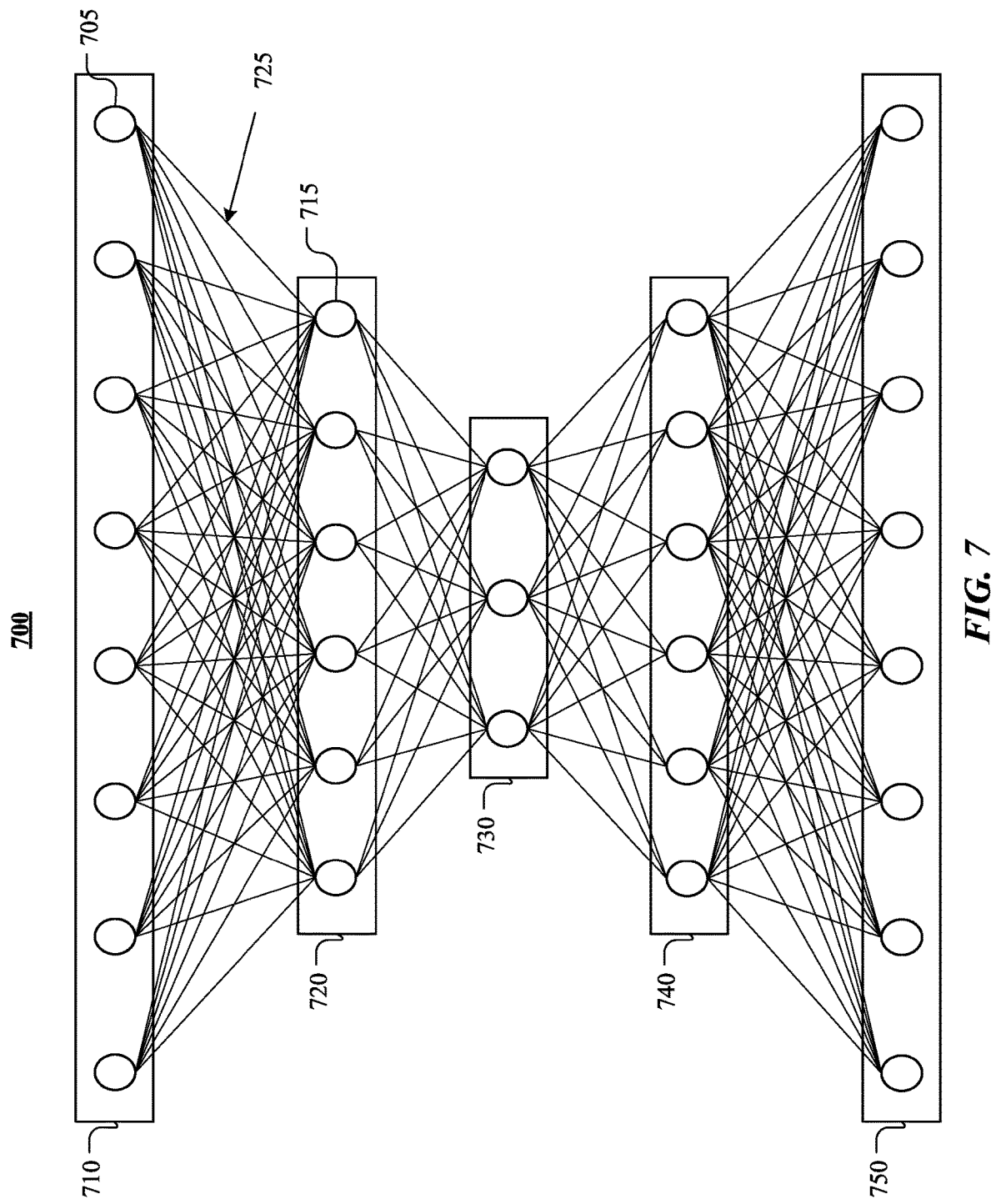
FIG. 7 illustrates an example artificial neural network.

FIG. 7 illustrates an example artificial neural network ("ANN") 700. In particular embodiments, an ANN may refer to a computational model comprising one or more nodes. Example ANN 700 may comprise an input layer 710, hidden layers 720, 730, 740, and an output layer 750. Each layer of the ANN 700 may comprise one or more nodes, such as a node 705 or a node 715. In particular embodiments, each node of an ANN may be connected to another node of the ANN. As an example and not by way of limitation, each node of the input layer 710 may be connected to one of more nodes of the hidden layer 720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 7 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 7 depicts a connection between each node of the input layer 710 and each node of the hidden layer 720, one or more nodes of the input layer 710 may not be connected to one or more nodes of the hidden layer 720.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 720 may comprise the output of one or more nodes of the input layer 710. As another example and not by way of limitation, the input to each node of the output layer 750 may comprise the output of one or more nodes of the hidden layer 740. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 725 between the node 705 and the node 715 may have a weighting coefficient of 0.4, which may indicate that 0.4 multiplied by the output of the node 705 is used as an input to the node 715. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 700 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 8:
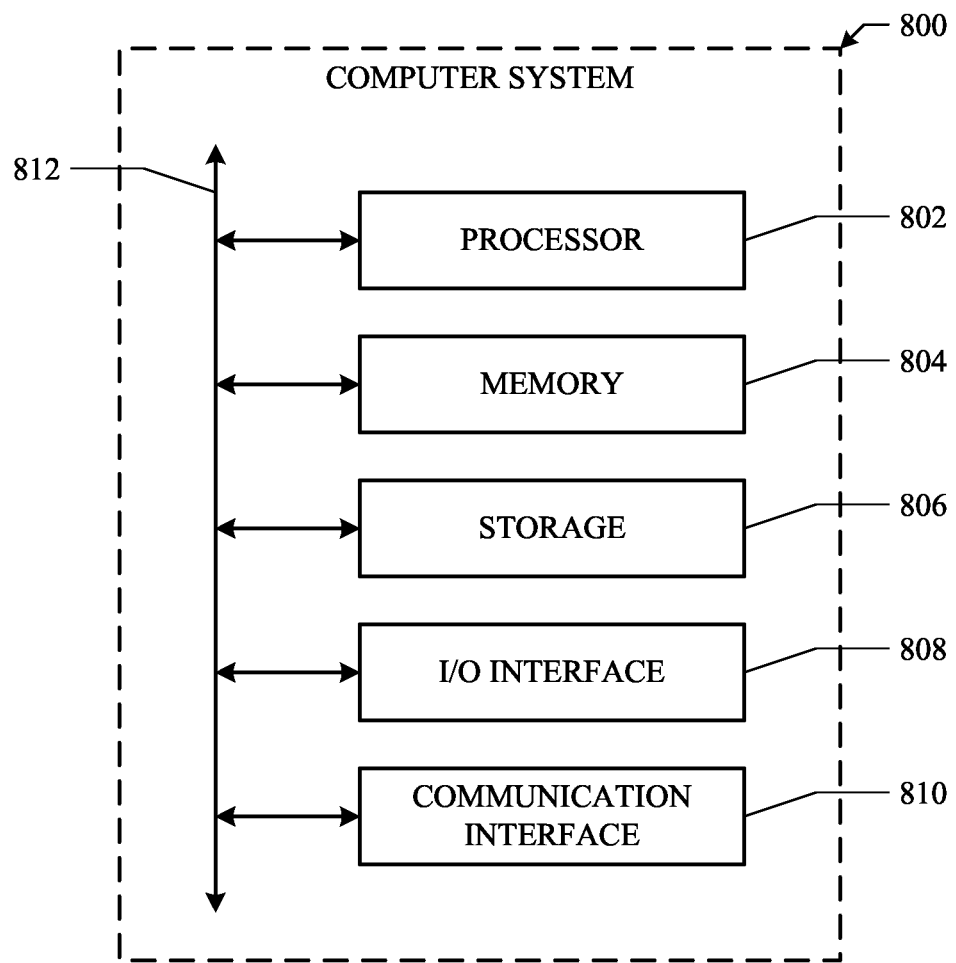
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    accessing a first document;
    accessing a plurality of second documents;
    determining, for the plurality of second documents, corresponding relevance scores indicating a degree of relevance of the plurality of second documents to the first document using a machine-learning model;
    selecting a subset of the plurality of second documents based on the corresponding relevance scores;
    generating a target document by using the machine-learning model to process the subset of the plurality of second documents and the corresponding relevance scores; and
    updating parameters of the machine-learning model based on a comparison between the first document and the generated target document.

2. The method of claim 1, wherein the machine-learning model comprises a sequence-to-sequence machine-learning model that comprises an encoder and a decoder.

3. The method of claim 1, wherein the plurality of second documents comprise documents published on a date that the first document is published on.

4. The method of claim 1, wherein the plurality of second documents comprise documents written in different languages.

5. The method of claim 1, wherein the plurality of second documents comprise documents associated with corresponding relevance scores determined using an encoder of the machine-learning model with parameter values updated in previous trainings exceed a pre-determined threshold.

6. The method of claim 1, wherein determining a relevance score for a second document comprises:
    generating a first embedding vector representing the first document using the machine-learning model;

generating a second embedding vector representing the second document using the machine-learning model; and determining a relevance metric between the first embedding vector and the second embedding vector.

7. The method of claim 6, wherein the relevance metric comprises a cosine similarity.

8. The method of claim 1, wherein the selecting the subset of the plurality of second documents comprises selecting k second documents whose associated relevance scores are higher than corresponding relevance scores for other second documents among the plurality of second documents.

9. The method of claim 1, wherein the generating the target document by using the machine-learning model to process the subset of the plurality of second documents and the corresponding relevance scores comprises:

generating, for the subset of the plurality of second documents, one or more latent representations using the machine-learning model;

concatenating the generated one or more latent representations, wherein a corresponding relevance score for generated embedding vectors is used to bias cross-attention from a decoder of the machine-learning model to an encoder of the machine-learning model; and generating the target document by using the decoder of the machine-learning model to process the generated one or more latent representations.

10. The method of claim 1, wherein the updating parameters of the machine-learning model is performed as a backpropagation procedure.

11. The method of claim 1, wherein the machine-learning model, after being trained, is used for at least one task.

12. The method of claim 11, wherein the at least one task comprises a paraphrasing of a document, or a translation of a document.

13. The method of claim 11, wherein the at least one task comprises a multi-document summarization, wherein a plurality of documents and associated pre-determined relevance scores are processed by the machine-learning model to generate a document summarizing the plurality of documents.

14. The method of claim 13, wherein the pre-determined corresponding relevance scores are identical to each other.

15. The method of claim 11, wherein the at least one task comprises an information retrieval, wherein k documents among a large number of documents that are more relevant to a given document are selected based on their corresponding relevance scores determined by an encoder of the machine-learning model.

16. The method of claim 11, wherein the at least one task comprises a document classification.

17. The method of claim 16, wherein an encoder of the machine-learning model is connected to a classifier that is trained to determine a class of an input document based on a latent representation that the encoder generates based on the input document.

18. The method of claim 16, wherein a decoder of the machine-learning model is re-trained to generate a word string indicating a class of an input document.

19. One or more computer-readable non-transitory storage media embodying software that is operable when executed to:

access a first document;

access a plurality of second documents;

determine, for the plurality of second documents, corresponding relevance scores indicating a degree of relevance of the plurality of second documents to the first document using a machine-learning model;

select a subset of the plurality of second documents based on the corresponding relevance scores;

generate a target document by using the machine-learning model to process the subset of the plurality of second documents and the corresponding relevance scores; and update parameters of the machine-learning model based on a comparison between the first document and the generated target document.

20. A system comprising:

one or more processors; and a non-transitory memory coupled to the one or more processors comprising instructions executable by the one or more processors, the one or more processors operable when executing the instructions to:

access a first document;

access a plurality of second documents;

determine, for the plurality of second documents, corresponding relevance scores indicating a degree of relevance of the plurality of second documents to the first document using a machine-learning model;

select a subset of the plurality of second documents based on the corresponding relevance scores;

generate a target document by using the machine-learning model to process the subset of the plurality of second documents and the corresponding relevance scores; and update parameters of the machine-learning model based on a comparison between the first document and the generated target document.

* * * * *